United States Patent Office 3,600,188
Patented Aug. 17, 1971

3,600,188
ANIMAL FEED MANUFACTURE
Morris D. Wilding, Downers Grove, and David M. Miller, Forest Park, Ill., assignors to Swift & Company, Chicago, Ill.
Filed July 18, 1967, Ser. No. 654,080
Int. Cl. A23k 1/00; C05c 9/00
U.S. Cl. 99—2                                11 Claims

ABSTRACT OF THE DISCLOSURE

Urea and proteinaceous materials having known nutritive value are intimately mixed at elevated temperatures and pressures and subsequently extruded. The resulting elongated particles may be subdivided and possess excellent slow release of urea properties. A wide range of proteinaceous materials and operating conditions are set forth.

The present invention relates to the manufacture of slow release, high nitrogen animal feeds and more particularly to the production of animal feeds containing significant amounts of urea.

The use of non-protein nitrogen feed additives to provide a high nitrogen feeding ration for ruminant animals is well known. One of these additives, urea, has long been used to provide a more economical source of nitrogen, which may then be converted by the rumen bacteria to the amino acids necessary for animal nutrition. These additives provide a more economical source of nitrogen than the comparative amount of native protein as contained in the common forage crops.

Several difficulties have attended the use of such non-protein nitrogen derivatives as urea. Among these are the possibility of ammonia poisoning because of the very rapid solubility of urea and its accompanying decomposition to ammonia. This results in an increased infusion of ammonia into the bloodstream at levels greater than the body can tolerate. Furthermore, even if the toxic threshold was not reached, too rapid diffusion of ammonia may result in excessive excretion of ammonia through the kidneys and hence lower the efficiency of utilization of a non-protein nitrogen source. In this connection, a technique which can be used to raise the toxic threshold is to acclimate the animals by gradually increasing the percentage contribution of non-protein nitrogen in the ration. In this way, 5–6 times normal dosage of urea is required before toxic symptoms are exhibited. This procedure is not generally practicable for feedlot animals due to the length of time required to acclimate them. These difficulties have had the effect of limiting the amount of non-protein nitrogen that may be typically added to the ration and hence have placed definite restrictions on the economic feasibility of this type of feeding.

A second difficulty attending the use of such urea additives arises because of the ureas' high degree of deliquescence which results in severe "caking" problems with urea-containing rations in on-site feeders. This problem of difficult handling has also contributed to consumer hesitation for full utilization of the advantages of non-protein nitrogen supplement feeding.

Still another disadvantage of prior art systems using urea is that the urea and animal feed mixtures tends to separate and cause non-uniformity. This can present problems when these feeds are analyzed for inspection purposes and may result in financial loss due to claims and litigation.

Despite the difficulties mentioned above, the tremendous commercial advantages to be realized from non-protein nitrogen supplement feeding, both for the consumer and feed manufacturer, have led to the production of large numbers of urea-containing feeds. These presently take two general forms. The first consists of a simple mixture of native protein sources, urea, fibrous materials, and any desirable type of trace additives, such as vitamins, antibiotics, minerals and growth-promoting substances. This has the obvious advantage of requiring little capital investment other than the necessary mixing chambers, feeders and the like. However, this type of product does little to resolve the problems outlined above.

Since simple mixing of the various ingredients does not solve the above-mentioned problems, and because of the well known nutritional advantages that accrue with the pelleting of a ration, manufacturers have concentrated on pelleting urea-containing rations. Such a process may simply consist of forming a mixture of protein source, urea, fibrous materials, vitamins, antibiotics, minerals and growth-promoting substances, etc., in a pellet-like form by means of a hydraulic press or similar device. Quite often, however, in practice, a slurry containing urea and water will be used which is then mixed with the dry ingredients of the ration and pelleted. This operation requires the addition of a relatively large amount of water and the mechanical work of the pelleting will result in sufficient generation of heat that additional cooling procedures are necessary. In practice, it is found that the cooling of this pelleted product is an especially critical step in the manufacture of feed. If too little cooling occurs, great problems in "caking" will be encountered. In this type of product, the urea is present in rather small weight percentages (typically 5 to 20 percent) of the total pellet and the added water serves to a very large extent as the binding agent for the pellet. The procedure results in a loose, easily crumbled pellet which breaks down rapidly and releases its urea nearly as quickly as if it were in an unpelleted form. Hence, although present methods of obtaining a urea-containing ration in pelleted form may have eliminated the problem of ingredient heterogeneity, it has done nothing to permit the use of higher levels of urea by means of slowly releasing it to the animal's rumen.

Accordingly, it is an object of this invention to manufacture a high non-protein nitrogen-containing feed supplement having slow release characteristics.

Another object is to provide high non-protein nitrogen-containing feed supplements in small particle size having essentially no tendency for caking.

Still another object of this invention is the manufacture of high non-protein nitrogen-containing feed supplements having ingredients distributed in a homogeneous manner and having little tendency to separate and cause non-uniformity.

Other objects, if not specifically set forth herein, will be readily apparent to those skilled in the art from a detailed description of the invention which follows.

Generally, the present invention relates to a method for the manufacture of a high non-protein nitrogen-containing feed supplement which will slowly release its urea into the animal's rumen so that it will be present for a susstained period in relatively high levels for microbial conversion to amino acids. A non-protein nitrogen source, such as urea, is combined with any one or combination of several types of foodstuff materials such as low fat soybean meal, highly fibrous materials, and various other additives. The ingredients are intimately mixed under about 50 to 700 p.s.i.g., preferably 100 to 500 p.s.i.g., and are thereby heated to a temperature in the range of about 200–350° F. Using this combination of pressures and temperatures, the material is subjected to this stress for approximately 10–120 seconds, preferably 30–60 seconds, whereby the material is converted into a plastic matrix. The plastic matrix has a sausage-like appearance and while almost fluid will not flow by itself. This unique matrix is then passed through a suitably sized orifice. The material is normally released to atmospheric conditions and immediately subdivided into desirable sized particles. Upon cooling, the plastic matrix solidifies to a relatively hard material having no tendency to agglomerate.

In carrying out the process of this invention, proteinaceous substances of known nutritive value are utilized. Such proteinaceous materials may be selected from glue, gelatin, blood, casein, egg albumen, blood albumen, lactalbumen, legumes, oilseed protein such as soybean, peanut, cottonseed proteins, etc. Proteinaceous materials in other forms which tend to hydrate but are readily water soluble may also be utilized. Such proteins include oilseed meals which have been heat treated, tissue meats, offal and the like. Small amounts of water insoluble proteinaceous materials such as hoofs, horns, feathers, hair, hide trimmings, wool, etc., can be tolerated, however, such materials should comprise less than 5% of the proteinaceous material of the food product.

In carrying out the solubilization of the proteinaceous material, no water need be added. The proteinaceous material is combined with approximately 25–65% urea and/or other food-grade ammonium salts, and the mixture is intimately mixed and stirred. The amount of urea utilized will depend upon the particular protein source as well as the degree of water solubility of the proteinaceous material. In fact, a correlation has been found between the weight percentage of urea needed to form a desirable matrix and the protein content and solubility (a rough measure of the extent of denaturization due to the processing) of the foodstuff used. Generally speaking, the higher the percentage of native protein contained in the feedstuff, the lower the weight percentage of urea needed to form a suitable hard matrix. This may be offset somewhat if a large percentage of the native protein is insoluble, i.e., denatured. A corresponding greater amount of urea may be needed in this case. These various effects will be made clear to one skilled in the art upon the reading of the examples set forth below. As a specific embodiment, a 30–36% by weight amount of urea is preferred when operating wtih soybean grits. Urea in the amount of 25–45% is acceptable, however, on the lower end of the range, the product will be a somewhat dark, puffy material that crumbles easily, while on the higher end of the range, the cool product is very hard and cannot be effectively broken up without a large loss due to unsuitable size distribution of particles.

It should be pointed out that the solubilization of the protein by use of the urea is a pressure-temperature function and while it is preferred to use pressures in the range of 100–500 p.s.i.g. and temperatures in the range of about 250–350° F., it should be realized that if one lowers the pressure, one may compensate for this by increasing the temperature and urea concentration. Likewise, higher pressures may enable one to use lower temperatures. In any event, utilization of the temperatures and pressures set out above will convert the urea into the liquid state which in turn solubilize the protein within a relatively short period of time, i.e., approximately 10–120 seconds, and upon mixing, will form an intimate matrix. It is the solubilization of the proteinaceous material by the urea that is the cause of the matrix formation. Further, the degree and kind of protein-urea matrix formed will depend upon the functionality as well as the quantity of protein present. This will be brought out further as a more detailed discussion of the invention is set forth.

The instant process should be contrasted with the prior art process of pelleting urea and proteinaceous feed materials. In the pelleting process, it is common practice to make a slurry containing urea and water which is then mixed with the dry ingredients of the ration and pelleted. This operation requires the addition of relatively large amounts of water and the mechanical work of pelleting will result in sufficient generation of heat, i.e., about 120° F., that additional cooling procedures are necessary. In practice, it is found that the cooling of pelleted product is an especially critical step in manufacture of the feed. If too little cooling occurs, great problems in caking will be encountered. Further, in the pelleting process, only small quantities of urea, typically 5 to 20%, are utilized.

On the other hand, the treatment of the process of this invention results in a different type of product. This is so since the pressure developed in the instant process as well as the temperatures employed are much greater than in the case of the prior art pelleting procedures which may typically utilize pressures of 20–90 p.s.i. and temperatures less than 120° F. The continuous intimate mixing of the urea and proteinaceous material at temperatures of 200–350° F. and at a pressure of 50 to 700 p.s.i.g. results in urea-protein interaction which is unattainable in ordinary pelleting procedures. Yet, the process of this invention does not result in any appreciable amount of carbamination which is clearly undesirable. In carrying out the process of this invention, it is estimated that less than about 1% of the total reaction results in carbamination.

In order to set forth specific embodiments of the invention, as well as preferred procedures, the descriptive part of the specification uses urea as the solubilizing non-proteinaceous nitrogen-containing source. However, it is obvious that the use of food-grade ammonium salts will result in similar matrix formation. These ammonium salts, however, generally do have the disadvantage of being poorer solubilizers than urea. Hence, a greater weight percentage of these salts must be used to achieve desirable hard particle formation. It should be noted that stability of the product may be affected, particularly when the native protein feedstuff has been lightly heat treated prior to use in the instant process and still possesses a high level of urease enzyme activity. Either spontaneously or in the presence of small amount of water, this can lead to the enzymatic breakdown of urea to ammonia, rendering the product undersirable. To prevent this, urease inhibitors may be added. In practice, it has been found that the inhibitors, for example, alkaline metal halides such as but not limited to potassium iodide, etc., or other well known inhibitors such as heavy metals, may be added either in a concentrated solution form or as a dry powder. It should be noted that the process does not destroy vitamins and hence probably does not completely inactivate the enzyme which may be initially present.

It is preferred not to add water to this system, particularly when dealing with a highly soluble proteinaceous feedstuff. In this connection, the low concentration of inhibitor needed for enzyme inactivation allows one to add the inhibitor in solution form without the addition of appreciable amounts of water to the product. It might also be mentioned at this time that the addition of non-solubilizing materials such as minerals tend to dilute or offset to a varying degree the formation of the desired non-protein nitrogen-containing matrix.

Various tests were conducted on the slow urea-releasing food products produced by this invention. Laboratory tests have established that the combination of urea and defatted soybean grits, for example, results in a product which releases ammonia slowly from the feed. In these tests, samples of the urea-soybean grit feed or other native protein source are mixed with ten parts of a buffer solution at a pH of about 6.63. These mixtures were agitated at ambient temperature. Small aliquots were taken at various times and placed in a quantity of buffer to which was added a jackbean urease solution. The reaction of urease and urea was allowed to proceed to completion (30 min.) at which time the ammonia produced from the urea was titrated to a constant pH, either 6.0 or 6.1 with standard acid. The milliliters of acid required to titrate the solution is a measure of the amount of urea dissolved, i.e., released from the feed particles. The results of the various tests, indicating slow urea release in vitro were graphed. Using these graphs, a comparison was made between the rate of solubilization of uncombined urea and the urea contained in test samples of the types produced in accordance with the examples of this invention. In some cases, a comparison was also drawn between test samples in the hard, distinct particle form and the same sample after it had been ground to about 500 microns.

The rate of the urea release in the case of the products produced in accordance with this invention shows that the urea had not been chemically combined, e.g., carbaminated in the process of forming the protein-urea matrix. It thus appears that the urea is involved in developing a unique physical structure to prevent rapid solubilization of urea.

From the graphs, it was determined that essentially all of the straight urea had dissolved in about 10 minutes while only about ⅓ of the bound urea in the feed produced with the teachings of this invention had dissolved during the same time. More important, however, due to the slow release properties, four to five times more urea can be used as compared to other commercial feeds, and still be tolerated by the animal. In addition, the feeds of this invention provide a steady amount of fresh nitrogen source for the organisms while with straight urea or conventional pelleted urea-containing feeds, the use of urea is a one-shot proposition and what the organisms cannot assimilate at that time is passed through the system. Accordingly, the feeds of this invention are of a much more efficient type as the organisms are given more of a chance to feed on the non-protein substance.

Further, clinical tests involving ruminate animals (sheep) have been conducted in an effort to follow the release of urea from the feed particle into the rumen by means of a haematic assay procedure. In this technique, the test animals were brought to a constant state with respect to their clinical blood values at which time they were fed a ration containing the test protein nitrogen or non-protein nitrogen source. Blood samples were obtained by the use of an external jugular tap at various times post prandial and were worked up for subsequent non-protein nitrogen assay.

At the 80% replacement level (80% of the protein equivalent in the diet replaced by the new product), relative blood non-protein nitrogen levels appeared to increase slightly (an average of 6.8 mg. NPN/100 ml. blood wherein NPN is non-protein nitrogen) over a 6-hour period with some indication of larger increases over a shorter time period. It should be noted that the trends expected from an 80% replacement with the physical mixture of urea and soybean meal were not observed, indicating that an increased level in the replacement would be needed to show the effect of the added urea. The results of the various experiments were graphed. It was seen that at the 80% replacement level, the instant product over a 6-hour period shows a sustained and elevated level of non-protein nitrogen in the blood. This is indicative of the amount of non-protein nitrogen being transported out of the rumen into the bloodstream. Hence, a sustained increase in this blood value shows that the product has indeed released its urea more slowly into the rumen and thus provided a higher and sustained level of non-protein nitrogen for microbial conversion to amino acids for nutrition.

The specific examples that follow are for illustrative purposes only and are not to be construed as imposing limitations on the scope of the invention other than those set forth in the appended claims.

EXAMPLE I

Approximately 32%, by weight, finely ground urea and 68%, by weight, defatted, 65% protein solubility (low-toast) soybean grits, were intimately mixed without added water and compressed with a screw-type expeller, resulting in pressures of between 50 to 700 p.s.i.g., and temperatures of 250–300° F. for 10 to 30 seconds. This mixture was then expelled through an orifice having a diameter of about ⅜". The mixture of urea and soybean grits which was in the form of a plastic matrix was then cut into suitably sized particles by means of a rotating knife. This product showed no tendency to agglomerate after cooling and displayed a retarded rate of urea release in the order of about ⅓ that of straight urea.

EXAMPLE II

The addition of 20–23% by weight of finely ground urea to defatted low-toast soybean grits did not result in the desired particle formation after the processing described above, even with the addition of water.

EXAMPLE III

Approximately 24–30% by weight of finely ground urea was combined with defatted low-fat, low-toast soybean grits to a total of 100 parts and expelled under pressure without the addition of water. This product expanded to a dark, puffy material that crumbled more easily than did the particle described in Example No. I.

EXAMPLE IV

After blending 3% of a mineral, vitamin, antibiotic mixture, 65% defatted low-toast soybean grits, and 32% finely ground urea (292% equivalent protein) together and forcing the resultant mixture at 210–220° F. and at a pressure of 50 to 700 p.s.i.g. through a narrow orifice, a hard elongated particle was obtained. This product was not quite as plastic as the one described in Example No. I and its external appearance was somewhat rougher.

EXAMPLE V

An intimate mixture of 31–38% by weight finely ground urea and defatted high-toast soybean grits (containing a higher percentage of heat denatured, water insoluble protein than is the case with low-toast meal) was compressed and expelled. This resulted in an easily cut product quite as desirable as that in Example No. I.

EXAMPLE VI

With and without added water, soybean hulls were combined with higher levels of urea (45–55% on a weight percentage basis) than was possible consistent with good practice using soybean grits. The various products were rendered plastic by heating to 250 to 350° F. for 10 to 30 seconds under 50 to 700 p.s.i.g. and then extruded. The products showed no further tendency to agglomerate after the initial cooling period. Although the particle was not as hard as in the case of soybean grits and urea, it was very smooth in appearance and almost slate gray in color. The urea release properties of the products were such that about 3 to 4 times as much urea could be incorporated into the feed as compared to commercial feeds produced by prior art procedures.

EXAMPLE VII

Cottonseed meal (55–60 parts) was combined with finely ground urea, 40–45% by weight, and subjected to 300° F. for 15 seconds under a variable pressure of 50 to 700 p.s.i.g. The plastic matrix was then extruded and resulted in a satisfactorily elongated particle. The product exhibits excellent slow release properties.

EXAMPLE VIII

By combining two parts of soybean hulls, one part ground hay, and two parts of finely ground urea, a hard distinct particle was obtained upon cooling. Prior to extrusion, the mass was heated to 300° F. for 15 seconds under a pressure of 450 p.s.i.g. Even before the initial cooling step was undertaken, however, there was no tendency for these particles to agglomerate. The product of this example represents an article containing a proteinaceous source and a normal forage crop ingredient.

The product exhibited excellent slow release properties.

EXAMPLE IX

Cottonseed hulls and soybean hulls were combined in approximately equal weight percentages with 40–55% by weight of finely ground urea. This intimate mixture was treated in a manner similar to the procedure set out in Example No. I. The product had a desirable fiber level of approximately 20% and exhibited excellent slow release properties.

EXAMPLE X

Cottonseed hulls were intimately mixed with 40–60% by weight of finely ground urea. The mixture was mixed for about 15 seconds at 300° F. under a pressure of 500 p.s.i.g. and extruded into a reduced pressure area. The products exhibited excellent slow release properties.

EXAMPLE XI

Rice bran 45 to 50 parts was intimately mixed with finely ground urea for a total of 100 parts for 10 to 30 seconds at a temperature of 250 to 350° F. It was then extruded under 500 p.s.i.g. and at 300° F. No additional water was necessary to give a satisfactorily hard particle exhibiting excellent release properties.

EXAMPLE XII

Expeller extracted linseed meal in an amount of 60–70% was combined with 30 to 40% by weight of finely ground urea under conditions similar to those of Example No. I. No added water was necessary. The resulting particle was quite hard and showed no tendency to agglomerate after the initial cooling period. The product exhibited very satisfactory release properties.

EXAMPLE XIII

Peanut meal, approximately 50% protein, was combined in the ratio of 1 to 3 parts with finely ground urea. The mixture was rendered plastic by intimately mixing at 275° F. for 15 seconds under a pressure of 300 p.s.i.g. A hard particle was obtained without the necessity of added water.

In summary, it is pointed out that the production of slow release, high non-protein nitrogen containing feed produced in accordance with this invention practically eliminates the possibility of ammonia poisoning. This ammonia poisoning is decreased because of the retarded rate of solution of urea and its subsequent degradation to ammonia, while at the same time increased amounts of urea may be used as a source of non-protein nitrogen, thus enhancing the economic feasibility of this type of feed. Further, the problem of caking in a urea-containing feed is essentially eliminated by the strong physical binding of the urea which eliminates the tendency for caking.

Also, the nature of this intimately bound matrix prohibits particle separation found in previous products, and gives rise to a uniform product with even distribution of the non-protein nitrogen.

Obviously many modifications and variations of the invention as hereinbefore set forth may be made without departing from the spirit and scope thereof, and, therefore, only such limitations should be imposed as are indicated in the appended claims.

We claim:

1. An improved process for producing a ruminant protein feed product having an appreciable slow urea-release content comprising: intimately mixing in the absence of added water a proteinaceous animal feed material and finely ground, non-aqueous urea of from about 25 to about 65% of the product, said mixing being under a pressure of from about 100 p.s.i.g. to about 700 p.s.i.g. and at a temperature from about 200 to about 350 F. for a time of from about 10 to about 120 seconds whereby the urea liquifies and forms an intimate plastic matrix with the proteinaceous material; and extruding the matrix into a reduced pressure whereby the elongated matrix hardens on cooling and is characterized as a slow urea-release high nitrogen ruminant feed exhibiting no tendency to agglomerate.

2. The method of claim 1, wherein the elongated matrix is immediately sub-divided into desirable sized particles.

3. The method of claim 1, wherein the proteinaceous material is a forage crop.

4. The method of claim 1, wherein the proteinaceous material is derived from soybeans.

5. The method of claim 1, wherein the proteinaceous material is derived from cottonseeds.

6. The method of claim 1 wherein the mixing is conducted under a pressure of from about 100 to about 500 p.s.i.g.

7. In the method of claim 1 wherein the mixing is conducted for a time of from about 30 to about 60 seconds.

8. The product in accordance with claim 1.
9. The product in accordance with claim 3.
10. The product in accordance with claim 4.
11. The product in accordance with claim 5.

References Cited

UNITED STATES PATENTS

| | | | |
|---|---|---|---|
| 2,293,845 | 8/1942 | Millar | 99—2N |
| 2,986,840 | 6/1961 | Rogers | 71—30 |
| 3,180,735 | 4/1965 | Titus | 99—2 |
| 3,249,441 | 5/1966 | Reynolds et al. | 99—2N |
| 3,416,928 | 12/1968 | Freese | 99—2 |
| 3,490,912 | 1/1970 | Freese | 99—2 |

NORMAN YUDKOFF, Primary Examiner

C. P. RIBANDO, Assistant Examiner

U.S. Cl. X.R.

71—30